United States Patent [19]
Kitagawa

[11] 3,731,605
[45] May 8, 1973

[54] ELECTRONIC FLASH ADAPTER FOR PERCUSSION-IGNITABLE FLASH CAMERAS

[75] Inventor: Keisuke Kitagawa, Tokyo, Japan
[73] Assignee: Kalimar, Inc., St. Louis, Mo.
[22] Filed: June 25, 1971
[21] Appl. No.: 156,887

[30] Foreign Application Priority Data
   May 11, 1971  Japan .......................... 46/030873
   May 11, 1971  Japan .......................... 46/036983

[52] U.S. Cl. ............................................. 95/11 R
[51] Int. Cl. ........................................... G03b 19/02
[58] Field of Search .................. 95/11 L, 11 R, 11.5

[56] References Cited

UNITED STATES PATENTS

| 3,550,514 | 12/1970 | Harvey | 95/11 L |
| 3,364,829 | 1/1968 | Ackerman | 95/11.5 R |
| 3,581,637 | 6/1971 | Harvey | 95/11 L |
| 3,559,548 | 2/1971 | Ackerman | 95/11.5 R |
| 3,521,540 | 7/1970 | Cavallo | 95/11.5 R |

FOREIGN PATENTS OR APPLICATIONS 1,152,917  5/1969  Great Britain ........................... 91/11

OTHER PUBLICATIONS

T887,019 6-1971 Ernisse et al. 95 11 L

Primary Examiner—John M. Horan
Assistant Examiner—Kenneth C. Hutchison
Attorney—Ralph W. Kalish

[57] ABSTRACT

A device for adapting electronic flash units for use with cameras designed for use with percussion-ignitable flash lamps. The adapter includes a body member having a socket connector which engages the camera flash bulb receiving socket. The body also includes a support for engaging the pedestal of an electronic flash unit; within the body, contacts are provided for closing the electronic flash unit circuit upon operation of the camera shutter release.

9 Claims, 11 Drawing Figures

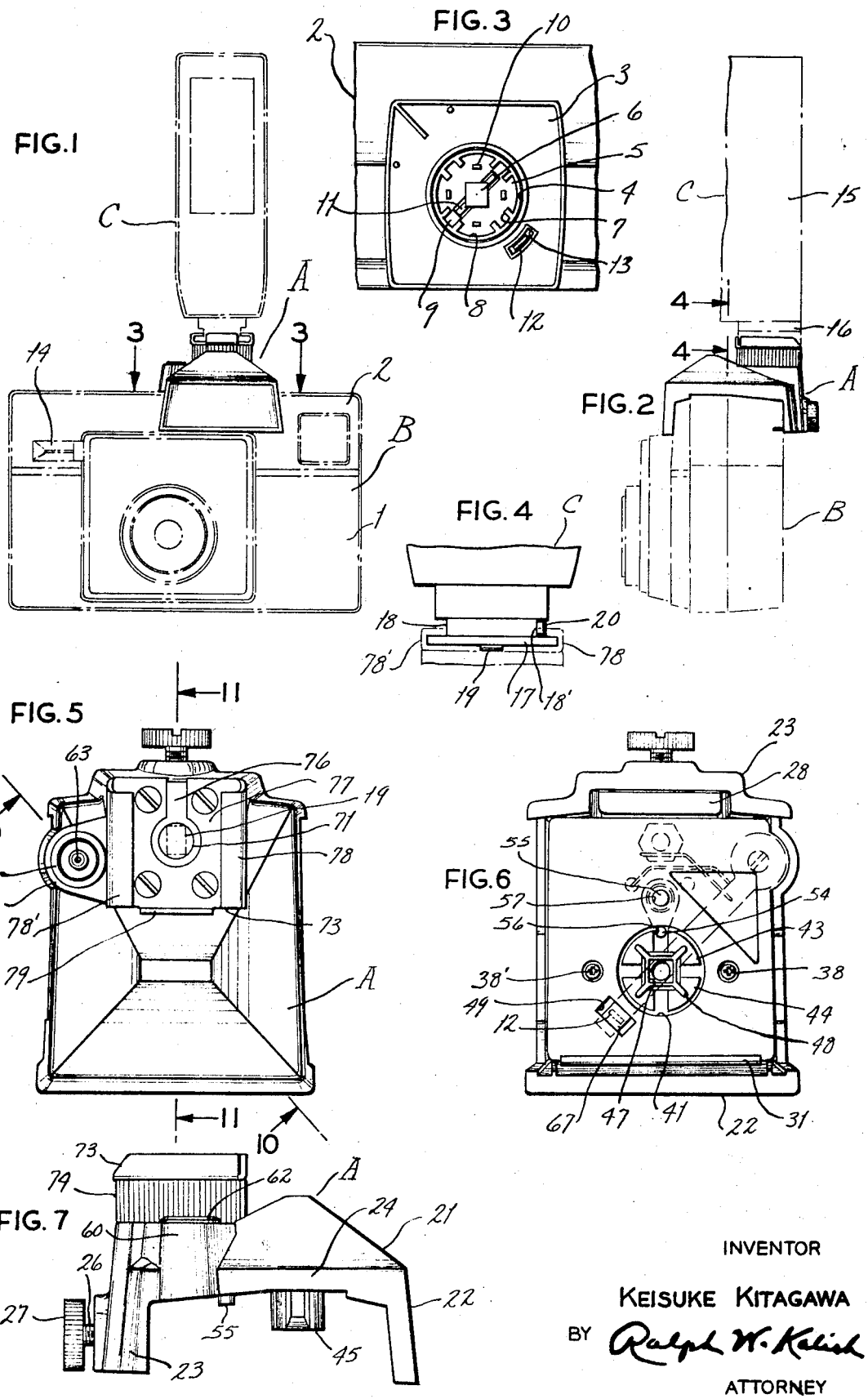

3,731,605

ELECTRONIC FLASH ADAPTER FOR PERCUSSION-IGNITABLE FLASH CAMERAS

BACKGROUND AND SUMMARY OF THE INVENTION

This invention relates in general to photography and more particularly to a device for adapting electronic flash units for use with cameras. In the customary cameras for personal or individual usage, there is normally provided a socket for receiving flash bulbs for providing artificial lighting. Such bulbs may require incorporation of a battery within the camera with circuit closure being effected upon shutter release or such bulbs may be self-contained, obviating the need for a battery as exemplified by bulbs currently identified by the trademark MAGICUBE. However, such bulbs customarily are arranged within a cube to provide four individual firings before replacement is needed. In more recent years there have been developed electronic flash units which incorporate, broadly, a battery, a photocell, and appropriate circuitry to provide a light flash having a period commensurate with the quantity of light received from the subject being photographed. Electronic flash units of this type are set forth and described in U.S. Pat. Nos. 3,033,988; 3,340,426; 3,350,604; and 3,350,603. These devices are capable of providing within the range of 40 light flashes or firings before battery recharging is required. Accordingly, utilization of such units obviates the need for frequent bulb replacement and also presents a marked versatility in that the light flashes are of varied time intervals as is necessary as opposed to the fixed flash period with the usual bulbs.

Heretofore, there has not been provided any means for adapting such electronic flash units for usage with cameras which have not been especially manufactured for accommodating same.

Therefore, it is a primary object of the present invention to provide a device for detachable engagement upon a camera which incorporates means for supporting an electronic flash unit and for operatively connecting the circuit thereof for closure upon actuation of the shutter release of the related camera.

It is another object of the present invention to provide an adapter of the character stated which embodies means for mechanical interengagement with the flash bulb-receiving socket means of the camera; without any deformation or change in the structure of the camera socket.

It is a further object of the present invention to provide an adapter of the character stated which incorporates readily operable means for gripping engagement with the camera casing so as to render said adapter stable, and hence proof against displacement during operation.

It is another object of the present invention to provide an adapter of the character stated which is a self-contained unit having no separate, extrinsic components; and which may be most economically produced.

It is a further object of the present invention to provide an electronic flash unit adapter for cameras which is versatile in that it permits of the so-called "hot shoe" or PC connection for the related electronic flash unit.

It is a still further object of the present invention to provide an adapter which is easily installed; the use of which will assure of requisite artificial light for the full length of the customary roll of film; which is compact and lightweight; which is of sturdy construction and hence resistant to breakdown so as to be durable in usage.

BRIEF DESCRIPTION OF THE DRAWINGS

FIG. 1 is a front view of an electronic flash adapter constructed in accordance with and embodying the present invention, illustrating the same in mounted disposition upon a camera and engaged to an electronic flash unit.

FIG. 2 is a side elevational view.

FIG. 3 is a fragmentary plan view taken substantially on the line 3—3 of FIG. 1 showing the flash cube socket of the camera, but with the adapter removed.

FIG. 4 is a vertical fragmentary front elevational view taken on the line 4—4 of FIG. 2, showing the pedestal portion of the electronic flash unit in dismounted condition.

FIG. 5 is a top plan view of the adapter.

FIG. 6 is a bottom plan view of the adapter.

FIG. 7 is a side view of the adapter as viewed from the left hand side of FIG. 5.

DESCRIPTION OF THE PREFERRED EMBODIMENTS

Figure 8:
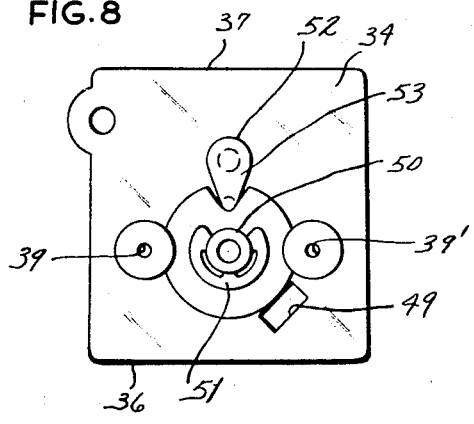
FIG. 8 is a plan view of the inner face of the closure plate.
Figure 9:
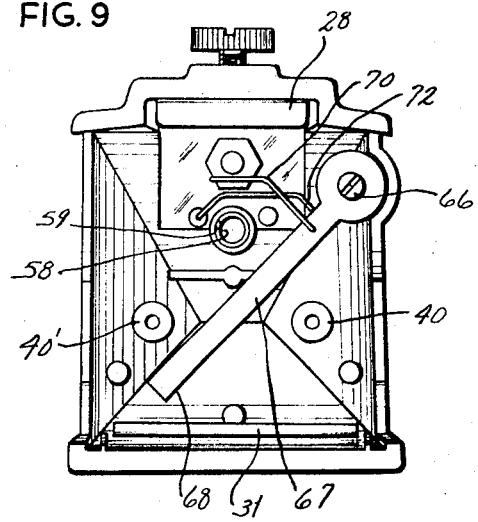
FIG. 9 is a bottom view of the adapter with the closure plate removed.

Referring now by reference characters to the drawings which illustrate the preferred embodiments of the present invention, A designates an adapter for mounted disposition upon a camera, indicated B, for the purpose of operationally integrating therewith an electronic flash unit generally denoted C, to provide a source of artificial light for photographic exposure purposes. Although it will be readily apparent from the following that adapter A could be designed for utilization with myriad types of cameras and electronic flash units, for purposes of example herein, camera B is illustrated as of the well-known type referred to customarily by the trademark INSTAMATIC, which at the present time are identified by model Nos. X–15, X–25, X–35, and X–45. Since the construction of these cameras is a matter of general knowledge, for brevity, reference herein will be made to only certain structural details thereof for demonstrating the coaction of the same with adapter A.

Camera B incorporates the usual exterior housing or casing 1 which coacts with a movable top closure 2. Provided upon the upper surface of top closure 2 is a plate 3 having an annular opening 4 for receiving the upper end of a flash bulb socket 5 which is adapted for rotation through, preferably, 90° increments by means of a lever and gear system (not shown) controlled by a film advance lever (not shown) presented exteriorally and rearwardly of camera B. At the present time flash bulbs are normally of the cube type in that the same bodily incorporate four bulb portions so that as the film is advanced an unfired bulb will be presented for firing by the contemporaneous rotation of socket 5. Socket 5 which does not form a part of the present invention embodies a central stem or male member 6, usually of square cross section, and with pairs of vertical ridges, as at 7, being disposed spacedly about the innter face of the wall 8 of socket 5 so as to present grooves 9 at 90 degree intervals. Radially inwardly of each set of ridges 7 and located substantially intermediate each pair are relatively narrow upright fingers 10. Slideably provided within a slideway (not shown) formed in stem 6 is a cross arm 11 being normally urged upwardly and being operatively interconnected to a firing finger 12 adapted for vertical reciprocal movement through a slot-like opening 13 provided in plate 3 radially beyond socket 5. In normal operation with a current flash bulb received within socket 5, firing finger 12 will be normally upwardly projected upon actuation of the film advance. Upon operation of the shutter release lever, as shown in phantom lines at 14, said firing finger will be moved further upwardly a sufficient distance to engage a firing wire located within the flash bulb for causing the related bulb portion to be fired. As stated, the foregoing does not constitute a part of the present invention but is set forth for the purpose of providing requisite environment for a comprehension of the present invention.

Electronic flash unit C is of the type referred to hereinabove and is also not to be considered a part of the present invention. Said unit C incorporates a relatively narrow casing 15 having in its under rearward portion a downwardly extending pedestal 16 which incorporates a relatively wide base plate 17; there being front to back, laterally opening grooves 18,18' immediately above said base plate 17, the adjacent portions of which constitute the base of said grooves 18, 18'. Extending through base plate 17, substantially centrally thereof, is a spring urged contact 19 with a similar type of contact 20 projecting into groove 18' from the adjacent portion of pedestal 16. Said contacts 19, 20 constitute part of the circuitry of flash unit C and being designed for connection to circuit closing expedients extrinsic of flash unit C.

Adapter A incorporates a body, generally indicated 21, which is, preferably, of moulded plastic construction and which when considered from front to back, in vertical cross section, is of general U or saddle shape having forward and rearward depending legs 22,23, respectively, for disposition against the confronting front and rear surfaces of camera top closure 2, respectively, with the central or intervening portion, as indicated generally at 24 of body 21 extending across the top surface of closure 2 above plate 3.

Figure 11:
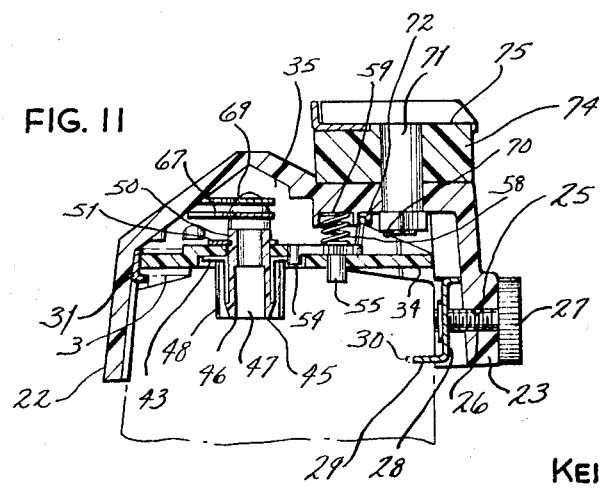
FIG. 11 is a vertical transverse sectional view taken on the line 11—11 of FIG. 5.

Rear leg 23 is substantially centrally provided with a tapped opening 25 for receiving the stem of an adjustment screw 26 having an enlarged outer head 27 and carrying on its inner end a bracket 28 having on its lower end a tongue 29 for acceptance within the line of jointure between camera casing 1 and closure 2 as suggested in phantom lines at 30 in FIG. 11. Thus by inward threading of screw 26, bracket 28 is tightly secured with respect to camera casing 1 while, obviously, unthreading of said screw by appropriation of head 27 will effect a loosening action. Fixed in the upper inner portion of forward wall 22 is a relatively shallow lip-forming element 31 extending transversely of said leg 22; which lip 31 is receivable beneath the forward edge of plate 3. By means of fixed lip 31 and moveable bracket 28, adapter A may be mounted in a stabilized manner upon camera B against inadvertent displacement; said mounting components thus being adapted to cooperate with characteristics of camera B to prevent accidental displacement during usage.

The central portion 24 of body 21 of adapter A comprises a top wall 32 having upwardly converging sections as 33 to coordinate with a flat closure plate 34 disposed downwardly thereof to define a chamber 35. Said closure plate 34 is of general quadrilateral configuration and with its front and rear margins 36,37, respectively, abutting the confronting upper inner portions of legs 22,23, respectively; whereby said plate provides the bottom wall of chamber 35. Said closure plate 34 is removeably secured to adapter body 21 by means of screws 38,38' which progress through openings 39, 39', respectively, formed in said plate 34 and being engageable within tapped bosses 40,40', respectively, integral with the inner side of top wall 32. In its normally underface plate 34 is formed with a downwardly opening relatively shallow annular recess 41 having a central aperture 42. Provided for free rotation within recess 41 is a base plate 43 comprehending four equispaced segments 44; said base plate 43 being a component of a flash bulb socket engaging member indicated generally 45 and which includes a depending sleeve or female portion 46 having a four side bore 47 for engaging stem 6 of camera B for effecting a mechanical union between the same. Integral with sleeve 46 and extending obliquely outwardly from each of its corners, in general angle bisecting relationship to the proximate segment 44 are tenons 48 of like extent as sleeve 46 for interfitting relationship with the grooves 9 provided in camera socket 5 for completing the interconnection between adapter A and camera B. By the foregoing it will thus be seen that as camera socket 5 is rotated through actuation of the film advance lever, sleeve 46 will correspondingly be rotated. By reason of cross arm 11 within camera socket 5 extending in a general diametrical manner between opposed grooves 9 the related tenons 48 will cause a downward pressure upon said cross arm 11 for appropriate resultant upward projection of firing finger 12, readying same for firing. It will be noted that plate 34 includes an aperture 49 for registration with opening 13 in camera plate 3 so that firing finger 12 will project into chamber 35 for purposes presently appearing. Member 45 upwardly of sleeve 46, embodies a short tubular portion 50 for extension through aperture 42 in closure plate 34. Secured upon the outer surface of tubular portion 50 immediately above plate 34 is an arcuate locking member 51 for preventing undesired detachment of member 45 from plate 34.

For maintaining member 45 in proper disposition for effecting union with the socket 5 of the related camera B, there is provided a latch 52 comprising a relatively small plate 53 of spatulate form for normal disposition upon the upper surface of closure plate 34; said plate having a relatively short depending pin 54 at its end proximate the center of plate 34 and a relatively enlarged finger 55 at its other end; said pin 54 and finger 55 projecting through openings 56,57 respectively, provided within plate 34. Upon the upper surface of plate 53 above finger 55, bears one end of a coil spring 58, the other end of which is received within a recess 59 formed within the overlying portion of top wall 32. Thus, by said spring 58 latch 52 is urged downwardly with pin 54 and finger 55 extending through openings 56,57, respectively. By reference to FIG. 6 it will be seen that said opening 56 opens at its lower end through recess 41 and having a diameter commensurate with the normal spacing between adjacent segments 44 of base plate 43. Thus, when adapter A is disposed upon camera B in operative condition finger 55 will abut against the upper surface of plate 3 and be forced upwardly against the bias of spring 58 with such movement terminating when the lower end face of finger 55 is aligned with the lower face of closure plate 34. By such movement pin 54, by reason of its relative size, will have been removed upwardly of its opening 56 and thus withdrawn from disposition between adjacent segments 44 so that plate 43 will then be freed for rotative movement. When adapter A is withdrawn from engagement with camera B the pressure of spring 58 will urge latch 52 downwardly. Such movement may only be completed when a spacing between adjacent segments 44 is aligned with opening 56 so that pin 54 may move into opening 56. By such movement member 45 is appropriately disposed within recess 41 for alignment with the cooperating components of the socket 5 of the related camera B.

Figure 10:
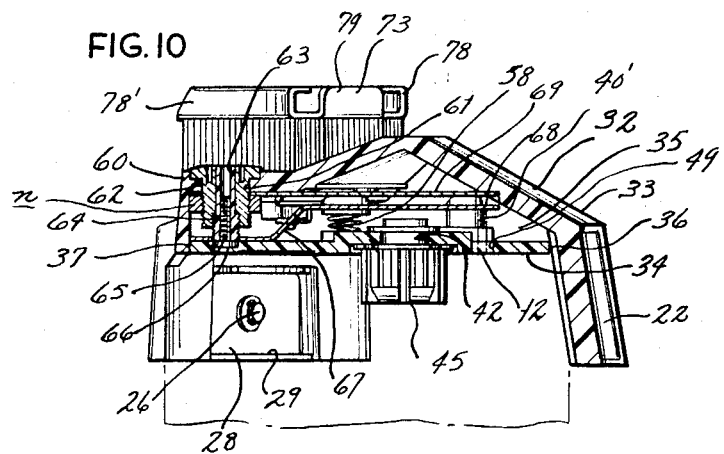
FIG. 10 is a vertical transverse sectional view taken on the line 10—10 of FIG. 5.

Formed in the rearward side portion of top wall 32 is a boss 60 having a relatively enlarged opening 61 for receiving an insulating sleeve 62 internally provided with a tubular conductor 63; said latter having a relatively thick walled lower portion 64 which is externally threaded for engaging the adjacent portion of insulator 62 (FIG. 10). Said tubular conductor 63 is internally threaded for engaging the stem of a screw 65, the head of which 66 is presented downwardly within a recess in closure plate 34. Engaged about the lower portion of tubular conductor 63 is one end of an elongated flat switch arm 67 which is so contoured and of such extent as to present the undersurface of its opposite or free end, as at 68, in overlying relationship to aperture 49. Engaged about insulator sleeve 62 spacedly upwardly of the proximate end of arm 67 is a nut $n$ upon the upper face of which is disposed one end of a companion switch arm 69, of like character and extent as switch arm 67, and being presented normally in axially parallel spaced overlying relationship to switch arm 67. Both of said arms 67,69 are preferably metallic having an inherent resiliency. Lower switch arm 67 proximate its connection to conductor 63 is engaged to one end of a conductive wire 70, the opposite end of which is fixed to the lower end portion of a conductive post, more commonly referred to as a "hot shoe" 71. Upper switch arm 69 is grounded by a connector 72 leading to a metallic retainer 73 for the pedestal 16 of electronic flash unit C. Said post 71 projects upwardly through a relatively enlarged boss 74 having a flat top surface 75 and extending above the rear portion of top wall 32. The upper end of post 71 is exposed through the top surface of boss 74, but is spaced, as by a general keyhole opening 76 in the bottom plate 77 of retainer 73 from the adjacent portions thereof so as to prevent inadvertent conductive relationship therewith. Bottom plate 77 of retainer 73 is substantially coextensive with top surface 75 of boss 74 and in its lateral portions is turned upwardly and inwardly to define guides 78,78' for accepting the side margins of base plate 17 of unit C when the latter is in mounted disposition for securing same against undesired displacement. In its rear portions plate 77 is centrally provided with a turned up stop 79 against which the rear portion of pedestal 16 abuts.

With reference to FIGS. 4 and 5, it will be seen that when flash unit C is disposed upon adapter A contact 19 thereof will be in circuit-establishing relationship with the upper end of post 71 and contact 20 will be engaged with the adjacent guide 78' for grounding. Thus, contacts 19 and 20 of unit C will be respectively in circuit with switch arms 67,69.

Through their inherent resiliency, and by reason of their peculiar mountings, switch arms 67,69 will be in normally spaced apart relationship. However, upon actuation of the camera shutter release firing finger 12 will project upwardly a sufficient extent to force the free end 68 of switch arm 67 upwardly into circuit closing relationship with switch arm 69 thereby closing the circuit within flash unit C for properly energizing same for flashing. Since firing finger 12 will return downwardly upon termination of the shutter release operation, switch arms 67,69 will be thereby allowed to part for circuit opening condition. Thus, by the means described, flash unit C is appropriately energized by the so-called "hot shoe" established by post 71.

However, it is known that certain types of commonly used electronic flash units C are not adapted for the "hot shoe" type of connection but utilizes a so-called PC connection which in essence is but the utilization of flexible insulation-covered wire which may be, as it were, plugged into the socket developed by tubular conductor 63 thereby being brought into conductor relationship with switch arm 67 through said conductor 63. With a connection of this type, it will be seen that upon engagement of switch arms 67,69 by action of firing finger 12 the circuit will be closed through conductor 63 so that current may flow through the wire connector and with switch arm 69 maintaining the ground contact through retainer 73.

Thus, it will be seen that adapter A is readily designed for use with either type of electronic flash unit currently available so that the user need merely make the proper insertion if the "PC" connection is used, otherwise no manipulation is required.

In view of the foregoing it is indeed obvious that adapter A is suitable for ready use in integrating a camera and electronic flash unit for joint operation, eliminating resort to flash bulbs for artificial light and thereby assuring the user of a source of light commensurate at least, and most probably greater, than the number of exposures provided by the film being used.

Having thus described my invention, what I claim and desire to obtain Letters Patent for is:

1. The combination with a camera having an exterior housing having a top wall, a flash bulb receiving socket provided in said top wall and opening upwardly therethrough, said top wall having an aperture adjacent said socket, a flash bulb firing pin, and means for causing said pin to project upwardly through said aperture, of an electronic flash unit for providing artificial light for camera film exposure, said unit having a circuit with a pair of first and second normally open contacts, and of an adapter for rendering said electronic flash unit operable with said camera, said adapter comprising a body having a base plate supportable upon said camera wall, a member depending from said plate for extension into said socket, means rotatably mounting said member in said plate, means defining a chamber above said plate, said plate having an opening aligned with said camera top wall aperture for extension of said firing pin into said chamber upon operation, a boss formed integral with said adapter and provided adjacent said chamber for mounting thereon of said electronic flash unit, first and second conductors extending through said boss for respective circuit-establishing relationship with said first and second contacts, and normally open switch means provided within said adapter chamber and connected to said first and second conductors, said switch means being positioned for closure upon actuation of the firing pin.

2. The combination as defined in claim 1 and further characterized by said adapter embodying normally front and rear legs projecting downwardly from said plate for disposition confrontingly of front and rear surfaces of said camera housing, and means associated with at least one of said legs for securing said adapter firmly upon said camera housing.

3. The combination as defined in claim 2 and further characterized by one of said adapted legs being provided with a tapped opening, an adjustment screw engaged in said opening, and a bracket carried upon the inner end of said screw for engaging said camera housing upon tightening of said screw.

4. The combination as defined in claim 1 and further characterized by said switch comprising a pair of vertically spaced elongated arms; said arms being sufficiently resilient to cause circuit closure under operation of said firing pin.

5. The combination as defined in claim 1 and further characterized by film advance means operatively connected to said socket to rotate same coincident with film advance, means rendering said member rotatable upon operation of said film advance means, and latching means provided within said adapter chamber for inhibiting rotation of said member after angular travel thereof through a predetermined arc.

6. The combination as defined in claim 1 and further characterized by said electronic flash unit having its first contact opening through its base, said first conductor extending through said boss for engaging said first contact, said electronic flash unit second contact provided upwardly and laterally of said first contact, said second conductor extending upwardly through said boss spacedly from said first conductor, means connecting said second conductor and said second contact, said switch means comprising a first switch arm provided within said chamber and being engageable proximate one end thereof with said first conductor, a second switch arm provided within said chamber in vertically spaced aligned relationship to said first switch arm and being engageable to said second conductor, each of said switch arms being free in their portions remote from their engagements with their respective conductors, the free ends of said switch arms overlying the firing pin-receiving opening in said plate.

7. For use with a camera having an exterior housing with front and back walls and a top wall, a flash bulb receiving socket opening upwardly through said top wall, means within said socket for engaging a flash bulb, film advance means operatively connected to said means within said socket to rotate same coincident with film advance, a shutter release, and a vertically presented firing pin presented adjacent said socket being operable upon actuation of the shutter release for normally firing a flash bulb, said chamber housing top wall having an opening for upward projection therethrough of said firing pin upon actuation, and with an electronic flash unit for providing artificial light for camera film exposure, said unit having a circuit with normally open first and second contacts, an adapter for detachable disposition upon said camera comprising a body having a base plate and depending front and rear legs, said base plate being mountable upon said camera top wall and said legs being disposable in confronting relationship to the respective front and rear walls of said camera housing, adjustment means provided on one of said legs for detachably engaging said adapter upon said camera, means provided on said adapter for connection with the flash bulb engaging means within said socket, said adapter having a chamber upwardly of said base plate, there being an opening in said base plate for projection therethrough of said firing pin upon actuation, a normally open switch provided within said adapter chamber comprising upper and lower vertically spaced, registering arms, means connecting said upper and lower arms in one of their end portions respectively with said electronic flash unit first and second contacts, the other end portions of said arms being disposed above said firing pin-receiving opening in said base for switch closing thereby upon actuation of said firing pin.

8. An adapter as defined in claim 7 and further characterized by said means connecting said switch arms and said first and second contacts comprising a first connector mounted in said adapter and connected at one end fixedly to said upper switch arm, a second connector rigidly mounted in said adapter and connected at its normally inner end to said second arm, the ends of said first and second connectors remote from the respective switch arms being exposed through said adapter for circuit establishment with said first and second contacts of said electronic flash unit.

9. An adapter as defined in claim 7 and further characterized by said means provided on said adapter for connection with the flash bulb engaging means within said socket being adapted for rotative movement so as to rotate with said socket means, and a latch member inhibiting rotation of said adapter when the said adapter is disengaged from said camera.

* * * * *